US012235998B2

(12) United States Patent
Chen et al.

(10) Patent No.: US 12,235,998 B2
(45) Date of Patent: Feb. 25, 2025

(54) SYSTEMS AND METHODS FOR SECURE ACCESS TO A COMPUTING SYSTEM

(71) Applicant: Quanta Computer Inc., Taoyuan (TW)

(72) Inventors: Cheng-Han Chen, Taoyuan (TW); Jyun-Jei Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 322 days.

(21) Appl. No.: 17/875,967

(22) Filed: Jul. 28, 2022

(65) Prior Publication Data

US 2024/0037283 A1 Feb. 1, 2024

(51) Int. Cl.
*G06F 21/64* (2013.01)
*G06F 21/31* (2013.01)
*G06F 21/57* (2013.01)

(52) U.S. Cl.
CPC .............. *G06F 21/64* (2013.01); *G06F 21/31* (2013.01); *G06F 21/572* (2013.01)

(58) Field of Classification Search
CPC ........ G06F 21/64; G06F 21/31; G06F 21/572; G06F 12/1408; G06F 12/1466; G06F 21/78; H04L 9/30
USPC .......................................................... 726/26
See application file for complete search history.

(56) References Cited

U.S. PATENT DOCUMENTS

| 8,863,309 | B2 * | 10/2014 | Wang | G06F 21/572 |
| | | | | 726/30 |
| 10,229,290 | B2 * | 3/2019 | Rahardjo | H04L 9/0897 |
| 11,995,182 | B2 * | 5/2024 | Shivanna | H04L 9/3271 |
| 2011/0083003 | A1 | 4/2011 | Jaber et al. | |
| 2013/0318338 | A1 | 11/2013 | Lambert et al. | |
| 2014/0351571 | A1 | 11/2014 | Jacobs | |
| 2018/0260568 | A1 | 9/2018 | Cisneros et al. | |

(Continued)

FOREIGN PATENT DOCUMENTS

| CN | 107784208 A | 3/2018 |
| CN | 111832084 A | 10/2020 |
| JP | 2013537335 A | 9/2013 |
| 2020/0134185 | A1 | 4/2020 Cho et al. |

OTHER PUBLICATIONS

TW Office Action for Application No. 111138565, mailed Apr. 21, 2023, w/ First Office Action Summary.

(Continued)

*Primary Examiner* — Bryan F Wright
(74) *Attorney, Agent, or Firm* — NIXON PEABODY LLP (57) ABSTRACT

A computing system includes a BIOS, a BMC coupled to the BIOS, and one or more hardware components. The BMC can receive commands from a user, and transition between a locked state and an unlocked state. When the BMC is in the unlocked state, the BMC responds to commands received from the user. When the BMC is in the locked state, the BMC ignores commands received from the user. The BMC is configured to receive an unlock command from a user that includes an unlock signature. The BMC is further configured to determine whether the unlock signature is authentic. If the unlock signature is authentic and the BMC is in the locked state, the BMC is configured to transition from the locked state to the unlocked state, to allow the user access to the hardware components of the computing system.

18 Claims, 3 Drawing Sheets

(56) References Cited

FOREIGN PATENT DOCUMENTS

| JP | 2017146694 A | 8/2017 |
|---|---|---|
| TW | 202024980 A | 7/2020 |

OTHER PUBLICATIONS

TW Search Report for Application No. 111138565, mailed Apr. 21, 2023, w/ First Office Action.
JP Office Action for Application No. 2023-016564, mailed Mar. 12, 2024, w/ First Office Action Summary, 11 pp.

* cited by examiner

SYSTEMS AND METHODS FOR SECURE ACCESS TO A COMPUTING SYSTEM

FIELD OF THE INVENTION

The present invention relates generally to systems and methods for improved security of computing systems, and more specifically, to systems and methods for improved security during in-band access.

BACKGROUND OF THE INVENTION

Servers are employed in large numbers for high demand applications such as network based systems or data centers. The emergence of the cloud for computing applications has increased the demand for data centers and other heavy operational demands. Data centers have numerous servers that store data and run applications accessed by remotely connected computer device users. A typical data center has physical chassis structures with attendant power and communication connections. Each rack may hold multiple computing servers and storage servers.

Servers allow users to access hardware components of the server for a variety of different purposes. Different users can connect to the server over different connections. For example, some users can connect to a server via an out-of-band connection, which generally allows the server manager (e.g., the owner and/or operator of the server) to easily control access to the server (for example via a log-in page that requires a username and a password). However, other users can connect to server via an in-band connection, which generally does not enable the server manager to control access as easily. Thus, there is a need for improved security of computing systems during in-band access.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system comprises a basic input output system (BIOS), a baseboard management controller (BMC) coupled to the BIOS, and one or more hardware components coupled to the BIOS and the BMC. The BMC is configured to receive commands from one or more users of the computing system, and to transition between a locked state and an unlocked state. The BMC is configured to receive an unlock command from a respective user of the one or more users. The unlock command includes an unlock signature. The BMC is further configured to determine whether the unlock signature is authentic. The BMC is further configured to, in response to being in the locked state and determining that the unlock signature is authentic, transition to the unlocked state to allow the respective user to access the one or more hardware components.

According to certain aspects of the present disclosure, the BMC is further configured to remain in the locked state in response to being in the locked state and determining that the unlock signature is not authentic.

According to certain aspects of the present disclosure, when the BMC is in the unlocked state, the BMC is configured to respond to (i) one or more commands received from the respective user that are not unlock commands, (ii) one or more unlock commands received from the respective user that do not contain an authentic unlock signature, or (iii) both (i) and (ii).

According to certain aspects of the present disclosure, when the BMC is in the locked state, the BMC is configured to ignore (i) any command received from the respective user that is not an unlock command, (ii) any unlock command received from the respective user that does not contain an authentic unlock signature, or (iii) both (i) and (ii).

According to certain aspects of the present disclosure, in response to transitioning to the unlocked state, the BMC remains in the unlocked state for a period, such that the BMC is configured to respond to (i) one or more commands received from the respective user within the period that are not unlock commands, (ii) one or more commands received from the respective user within the period that do not contain an authentic unlock signature, or (iii) both (i) and (ii).

According to certain aspects of the present disclosure, in response to the period ending, the BMC is configured to transition from the unlocked state to the locked state.

According to certain aspects of the present disclosure, the period includes a predetermined amount of time, a predetermined number of commands received from the respective user, or both.

According to certain aspects of the present disclosure, the unlock signature is encrypted. The BMC is further configured to decrypt the encrypted unlock signature and determine whether the decrypted unlock signature is authentic.

According to certain aspects of the present disclosure, the encrypted unlock signature is encrypted using a private key. The BMC includes a public key counterpart to the private key that is used to decrypt the encrypted unlock signature.

According to certain aspects of the present disclosure, the unlock signature is authentic if the decrypted unlock signature is identical to the unlock command.

According to certain aspects of the present disclosure, the unlock signature being authentic indicates that the unlock command was transmitted by a verified user of the computing system.

According to certain aspects of the present disclosure, the BMC is further configured to determine whether the computing system is undergoing a boot process. The BMC is further configured to receive a BIOS unlock command from the BIOS that includes a BIOS unlock signature. The BMC is further configured to determine whether the BIOS unlock signature is authentic. The BMC is further configured to, in response to being in the locked state and determining (i) that the computing system is undergoing the boot process and (ii) that the BIOS unlock signature is authentic, transition to the unlocked state. The BMC is further configured to, in response to being in the unlocked state and determining that the boot process has ended, transition to the locked state.

According to certain aspects of the present disclosure, the locked state of the BMC is a default state of the BMC, such that the BMC is in the locked state when the computing system is initially activated or restarted, and begins to undergo the boot process.

According to certain aspects of the present disclosure, the BMC is further configured to determine whether the computing system has entered a system management mode. The BMC is further configured to, in response to being in the locked state and determining that the computing system has entered the system management mode, transition to the unlocked state.

According to certain aspects of the present disclosure, the BMC is further configured to determine whether the computing system has exited the system management mode. The BMC is further configured to, in response to being in the unlocked state and determining that the computing system has exited the system management mode, transition to the locked state.

According to certain aspects of the present disclosure, a method of securing a computing system is disclosed. The computing system includes a basic input output system (BIOS), a baseboard management controller (BMC) coupled to the BIOS, and one or more hardware components coupled to the BIOS and the BMC. The method includes receiving an unlock command from a user of the computing system. The unlock command includes an unlock signature. The method further includes determining whether the unlock signature is authentic. The method further includes, in response to determining that the unlock signature is authentic and the BMC being in a locked state, causing the BMC to transition to an unlocked state, to allow the user to access the one or more hardware components of the computing system.

According to certain aspects of the present disclosure, the method further comprises, in response to determining that the unlock signature is not authentic and the BMC being in the locked state, causing the BMC to remain in the locked state.

According to certain aspects of the present disclosure, the method further comprises responding, by the BMC when the BMC is in the unlocked state, to (i) one or more commands received from the user that are not unlock commands, (ii) one or more unlock commands received from the user that do not contain an authentic unlock signature, or (iii) both (i) and (ii). The method further comprises ignoring, by the BMC when the BMC is in the locked state, (i) any command received from the user that is not an unlock command, (ii) any unlock command received from the user that does not contain an authentic unlock signature, or (iii) both (i) and (ii).

According to certain aspects of the present disclosure, the method further comprises, subsequent to causing the BMC to transition to the unlocked state, causing the BMC to remain in the unlocked state for a period, such that the BMC is configured to respond to (i) one or more commands received from the user within the period that are not unlock commands, (ii) one or more commands received from the user within the period that do not contain an authentic unlock signature, or (iii) both (i) and (ii).

According to certain aspects of the present disclosure, the method further comprises, in response to the period ending, causing the BMC to transition from the unlocked state to the locked state.

According to certain aspects of the present disclosure, the unlock signature is encrypted. The method further comprises decrypting the encrypted unlock signature and determining whether the decrypted unlock signature is authentic.

According to certain aspects of the present disclosure, the encrypted unlock signature is encrypted using a private key, and the BMC includes a public key counterpart to the private key that is used to decrypt the encrypted unlock signature.

According to certain aspects of the present disclosure, determining whether the unlock signature is authentic includes determining whether the unlock signature is identical to the unlock command.

According to certain aspects of the present disclosure, the unlock signature being authentic indicates that the unlock command was transmitted by a verified user of the computing system.

According to certain aspects of the present disclosure, the method further comprises, determining whether the computing system is undergoing a boot process. The method further comprises receiving a BIOS unlock command from the BIOS. The BIOS unlock command includes a BIOS unlock signature. The method further comprises determining whether the BIOS signature is authentic. The method further comprises, in response to the BMC being in the locked state and determining (i) that the computing system is undergoing the boot process and (ii) that the BIOS unlock signature is authentic, causing the BMC to transition to the unlocked state. The method further comprises, in response to the BMC being in the unlocked state and determining that the boot process has ended, causing the BMC to transition to the locked state.

According to certain aspects of the present disclosure, the locked state of the BMC is a default state of the BMC, such that the BMC is in the locked state when the computing system is initially activated or restarted, and begins to undergo the boot process.

According to certain aspects of the present disclosure, the method further comprises determining whether the computing system has entered a system management mode. The method further comprises, in response to the BMC being in the locked state and determining that the computing system has entered a system management mode, causing the BMC to transition to the unlocked state. The method further comprises determining whether the computing system has exited the system management mode. The method further comprises, in response to being in the unlocked state and determining that the computing system has exited the system management mode, causing the BMC to transition to the locked state.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

The examples disclosed herein relate to a computing device that includes a basic input/output system (BIOS), a baseboard management controller (BMC), and one or more hardware components. The BMC is configured to transition between a locked state and an unlocked state to control access to the hardware components by receiving and responding to commands from users. In the locked state, the BMC ignores commands received from users, so that the users cannot access the hardware components. In the unlocked state, the BMC responds to commands received from users, so that the users can access the hardware components. The BMC is configured to receive an unlock command from a user that contains an unlock signature. The BMC compares the unlock signature in the unlock command to a BIOS signature stored in the BIOS. If these signatures match, the BMC transitions to the unlocked state so that the user can access the hardware components of the computing system.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1:
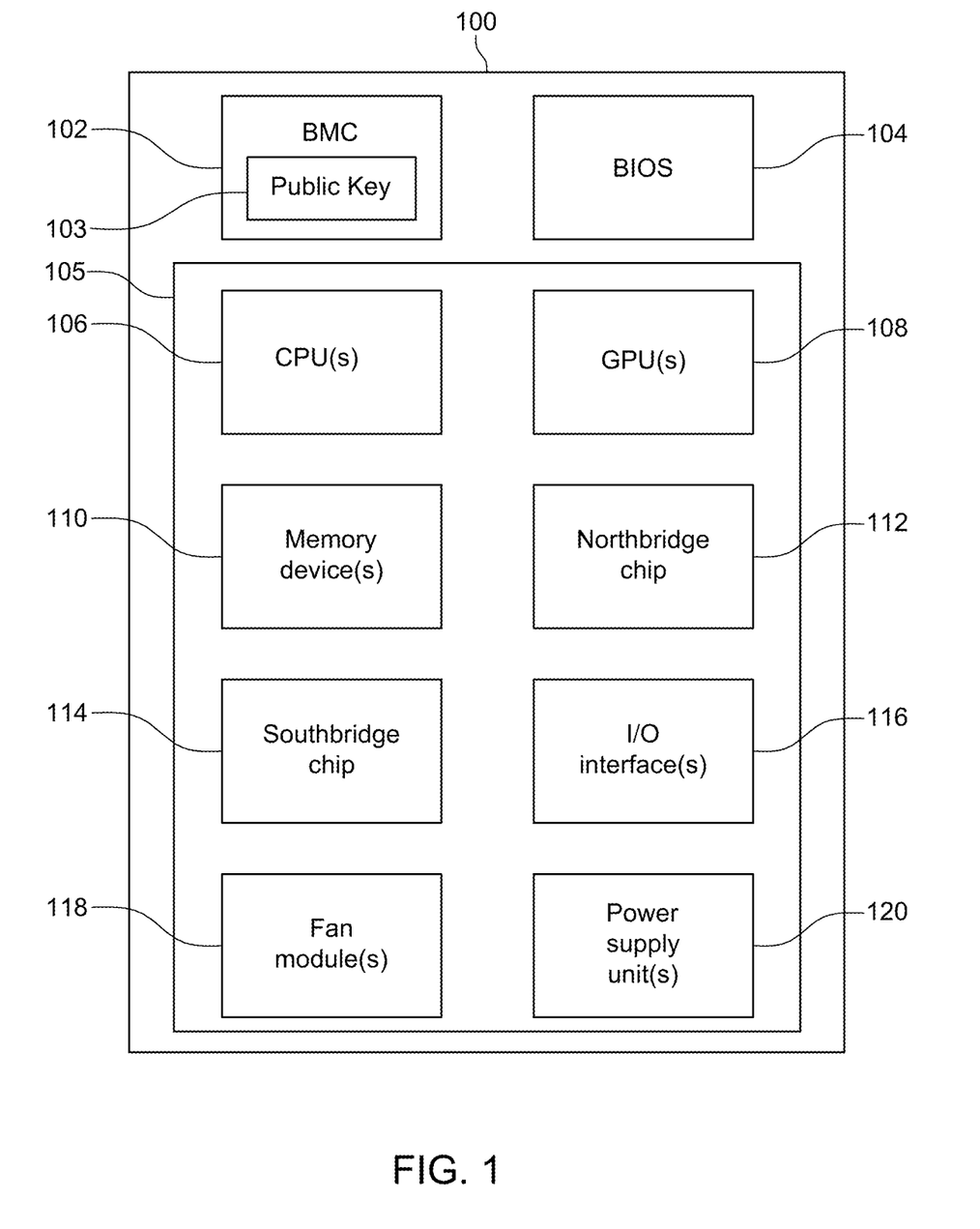
FIG. 1 is a block diagram of a computing system, according to certain aspects of the present disclosure, according to certain aspects of the present disclosure.

FIG. 1 illustrates a block diagram of a computing system 100 according to certain aspects of the present disclosure. In some implementations, the computing system 100 is a server, but the principles disclosed herein may be incorporated into any computing system having one or more of the components described herein. The computing system 100 includes a baseboard management controller (BMC) 102, a basic input output system (BIOS) 104, and one or more hardware components 105.

The BIOS 104 of the computing system 100 provides the basic instructions that are executed by BMC 102 (and/or any other processing units of the computing system 100) when the computing system 100 is turned on or restarted. The BIOS 104 is typically implemented as a memory chip that stores executable instructions. The BIOS 104 can run a power-on self-test (POST) routine that checks the status of hardware components 105 of the computing system 100 while powering up the computing system 100. In some implementations, the BIOS 104 includes non-volatile memory, such as a read-only memory (ROM) device or a flash memory device.

The BMC 102 generally includes its own processing unit and memory device. The processing unit of the BMC 102 can be used to execute the instructions of the BIOS 104 and/or firmware stored on the memory device of the BMC 102. The BMC 102 is configured to manage the operation of the computing system 100. In some implementations, the BMC 102 is used to implement the Intelligent Platform Management Interface (IPMI) standard. The BMC 102 can also control access to the computing system 100.

The hardware components 105 can be used to perform a variety of different computing tasks. In some implementations, the one or more hardware components 105 can include one or more central processing units (CPU) 106, one or more graphics processing units (GPU) 108, one or more memory devices 110, one or more northbridge chips 112, one or more southbridge chip 114, one or more input/output (I/O) interfaces 116, one or more fan modules 118, one or more power supply units 120, or any combinations thereof. However, the one or more hardware components 105 can be and/or include any other component that can be found in a computing system for performing various computing tasks.

The one or more memory devices 110 can include computer memory devices such as random-access memory (RAM), as well as storage media such as hard drives and solid-state drives. The I/O interfaces 116 can include a variety of different interfaces that can be used to transfer data, such as Ethernet interfaces, USB interfaces, serial interfaces, etc. The I/O interfaces 116 can be implemented as externally-accessible ports and any required internal circuitry connecting the ports to other components of the computing system 100.

Users may be granted access to the computing system 100 for a variety of different purposes through the BMC 102. The BMC 102 receives commands from users of the computing system 100 and can take appropriate action, including communicating with the hardware components 105 of the computing system 100. Thus, the BMC 102 allows the users to access the hardware components 105 of the computing system 100 to perform a variety of different tasks or functions. In some cases, users can access the computing system 100 via out-of-band access, which generally allows the manager of the computing system 100 (sometimes referred to as the server manager) to establish access conditions and other boundaries. These access conditions can be used to ensure that malicious users cannot gain access to the computing system 100. For example, the manager of the computing system 100 can require out-of-band users to access the computing system 100 using an authentication mechanism (such as a username and password), to ensure that only verified users can access the computing system 100.

In some cases, the users of the computing system 100 access the computing system 100 via in-band access, which allows these users to directly access the network of the computing system 100. The BMC 102 generally is not able to establish the same access conditions for users as compared to out-of-band access. It can thus be more difficult to ensure that malicious users do not gain access to the computing system 100, and prevent malicious users from manipulating the computing system 100 in undesired ways.

To prevent malicious users from accessing the computing system 100, the BMC 102 can be configured to ensure that only verified in-band users can access the computing system 100. To manage access to the computing system 100, the BMC 102 can transition between an unlocked state and a locked state. In the unlocked state, the BMC 102 will respond to commands and allow in-band users to access the hardware components 105 of the computing system 100 (e.g., the BMC 102 will generally act in a typical fashion). In the locked state, the BMC 102 will generally ignore any commands received from users (e.g., the BMC 102 will not respond to or otherwise take action in response to any of these commands). Thus, in-band users will generally not be able to access the hardware components 105 of the computing system 100 when the BMC 102 is in the locked state.

In order to transition to the unlocked state, the BMC 102 must receive an unlock command from a user that contains an authentic unlock signature. The BMC 102 determines whether the unlock signature in the unlock command is authentic. If the unlock signature is authentic (and the BMC 102 is not already in the unlocked state), the BMC 102 transitions to the unlocked state so that users can access the hardware components 105 of the computing system 100. If the unlock signature is not authentic, the BMC 102 will remain in the locked state. As used herein, the term "unlock signature" generally refers to any signature that is included with an unlock command. An unlock command that includes an signature that is not authentic is still considered to have an unlock signature.

In some implementations, when the BMC 102 is in the unlocked state, the BMC 102 will respond to (i) one or more commands that are not unlock commands (regardless of whether these commands include any type of signature), (ii) one or more unlock commands that do not contain an authentic unlock signature (e.g., unlock commands that contain an unauthentic unlock signature and/or unlock commands that do not contain any signature), or (iii) both (i) and (ii). In some implementations, the BMC 102 will respond to all non-unlock commands and/or all unlock commands without an authentic unlock signature. In other implementations, there may be certain non-unlock commands and/or unlock commands with an unauthentic signature that the BMC 102 will still ignore, even when in the unlocked state. For example, the manager of the computing system 100 may require the BMC 102 to ignore certain commands when in the unlocked state, so long as the BMC 102 does not ignore all commands when in the unlocked state.

In some implementations, when the BMC 102 is in the locked state, the BMC 102 will generally ignore (i) any command that is not an unlock command (regardless of whether these commands include any type of signature), (ii) any unlock command that does not contain an authentic unlock signature (e.g., unlock commands that contain an unauthentic unlock signature and/or unlock commands that do not contain any signature), or (iii) both (i) and (ii). In certain implementations however, there may be some commands that the BMC 102 will respond to in the locked state. For example, the manager of the computing system 100 may require that the BMC 102 respond to certain commands (e.g., emergency commands, help commands, etc.) when in the unlocked state, even if these commands are not unlock commands with an authentic unlock signature.

In some implementations, when the BMC 102 ignores commands received when in the locked state, the BMC 102 takes no action in response to these commands. In other implementations, when the BMC 102 ignores commands received when in the locked state, the BMC 102 provides an indication to the user that the BMC 102 is in the locked state and is ignoring the commands. When an unlock command is received, the BMC 102 will determine whether the unlock command contains an authentic unlock signature. If the unlock command is invalid (e.g., the unlock command contains no unlock signature, or contains an unauthentic unlock signature), the BMC 102 can either take no action, or provide an indication to the user that the unlock command was invalid. Similarly, if the unlock command is valid and the BMC 102 transitions to the unlocked state, the BMC 102 can either take no further action (other than transitioning to the unlocked state), or can provide the user with an indication that the unlock command was valid and that the BMC 102 is now in the unlocked state.

In the illustrated implementation shown in FIG. 1, the BMC 102 includes a public key 103 that can be used to authenticate any user that is sending commands to the BMC 102. This public key is the counterpart to a private key that is held by any verified user of the computing system 100. In some implementations, the private key is held by a manager of the computing system 100 and is given to a user who has validly obtained access to the computing system 100. The public key 103 can be used to decrypt any encrypted signatures that are sent with commands or messages received by the BMC 102. Generally, the public key 103 is stored on a memory device of the BMC 102. The public key 103 can have any suitable format. For example, the public key 103 can be any public key that is designed to work with a number of different digital signature schemes, such as the Rivest-Shamir-Adleman (RSA) system, the Digital Signature Algorithm (DSA) system, the Elliptic Curve Digital Signature Algorithm (ECDSA) system, the Edwards-curve Digital Signature Algorithm (EdDSA) system, and others.

The sender of the unlock command will encrypt the unlock signature using the private key, and the BMC 102 will uses the public key to decrypt the unlock signature. Once the unlock signature has been decrypted, the BMC 102 can then determine whether the decrypted unlock signature is authentic. If the unlock signature is authentic, the BMC 102 will transition to the unlocked state. In general, the unlock signature being authentic means that the user that sent the unlock command is a verified/approved user of the computing system 100, and has been given permission by the manager of the computing system 100 to access the computing system 100 via in-band access.

In some implementations, an authentic unlock signature is simply a copy of the unlock command that has encrypted and added to the unlock command. For example, if the unlock command consists of the text string "UNLOCK," an authentic unlock signature will be an encrypted version of the text string "UNLOCK" that has been encrypted using the private key. When the BMC 102 receives the unlock command, the BMC 102 decrypts the unlock signature using the public key and determines if the decrypted unlock signature matches the unlock command. If the decrypted unlock signature does match the unlock command (e.g., if decryption of the encrypted unlock signature results in the text string "UNLOCK"), then the unlock signature is authentic. If the decrypted unlock signature does not match the unlock command (e.g., if decryption of the encrypted unlock signature does not result in the text string "UNLOCK"), then the unlock signature is not authentic.

Thus, in some implementations, an authentic unlock signature is an unlock signature that is identical to the unlock command (e.g., the content of the unlock signature is the same as the content of the unlock command itself). This scheme enables the BMC 102 to accurately decrypt the unlock signature and determine if the unlock signature is authentic without having to have previously stored all potential authentic unlock signatures. Generally, the public key 103 is the only key that can be used to accurately decrypt the encrypted unlock signature (e.g., a signature encrypted using the private key held by the sender of the unlock command). Moreover, the public key 103 cannot be used to initially encrypt the unlock signature in a manner that would also allow the public key 103 to accurately decrypt that same encrypted unlock signature. Thus, a malicious user cannot use the public key 103 (which is publicly available) to add an encrypted unlock signature to an unlock command, in order to pretend to be a verified user.

In some cases, the manager of the computing system 100 holds the private key and provides it to verified users (e.g., users who validly obtained access to the computing system 100). Verified users can then use the private key to include the required unlock signature in an unlock command. In other cases, the manager of the computing system 100 does not provide the private key to verified users, but instead uses the private key to add the unlock signature to unlock commands received from valid users.

In some implementations, the locked/unlocked state of the BMC 102 is specific to each user of the computing system 100, or to each user of a subset of users of the computing system 100. In these implementations, the BMC 102 may be in the unlocked state for at least one user (and thus responsive to commands received from that at least one user), while simultaneously being in the locked state for at least one other user (and thus not responsive to commands received from that at least one user). In other implementations, the locked/unlocked state of the BMC 102 may be shared between at least two users, such that if one of the users sends a valid unlock command to the BMC 102, the BMC 102 will transition to the unlocked state for all of the users, and all of the users will be able to access the hardware components 105 of the computing system 100.

Figure 2:
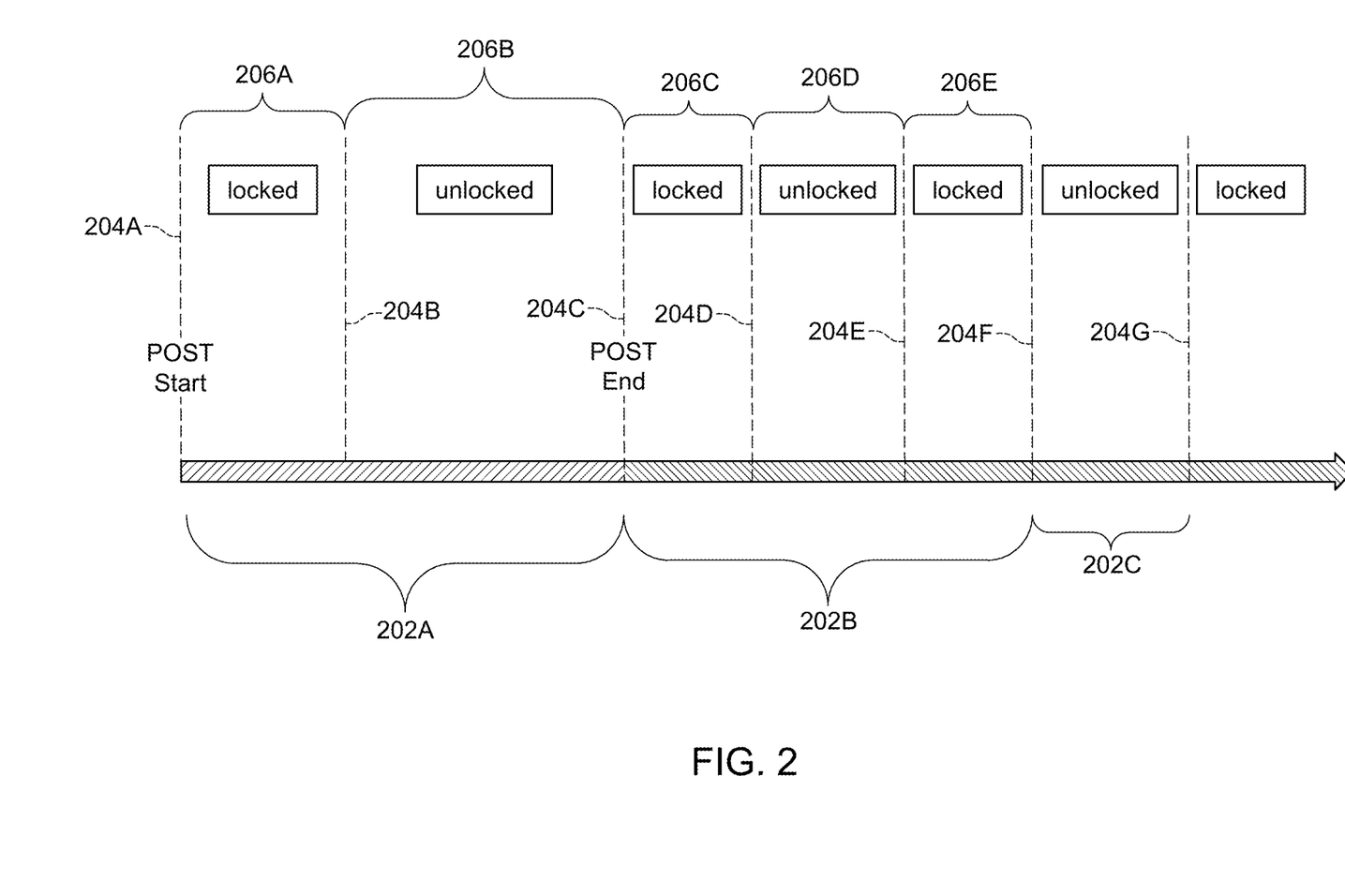
FIG. 2 is a flowchart of the state of a baseboard management controller of the computing system of FIG. 1, according to certain aspects of the present disclosure.

FIG. 2 shows a flowchart 200 of the operation of the computing system 100 (FIG. 1) that illustrates the functionality of the BIOS 104 and the BMC 102. The flowchart 200 includes a POST portion 202A, a runtime portion 202B, and a system management mode portion 202C. The POST portion 202A begins at time 204A, and corresponds to the period of time when the BIOS 104 is running a POST routine to initialize the computing system 100 (e.g., when the computing system 100 is undergoing a boot process). The POST routine may be run, for example, upon startup or restart of the computing system 100. The runtime portion 202B begins at time 204C when the POST routine ends. The runtime portion 202B corresponds to the period of time after the POST routine has ended, when the computing system 100 is operating according to its operating system. The system management mode portion 202C corresponds to a period of time when the computing system 100 is operating in the system management mode, which may occur if an error is detected.

During the POST portion 202A when the computing system 100 is undergoing the boot process, the BMC 102 can receive commands directly from the BIOS 104. However, in a situation where the BIOS 104 has been corrupted (e.g., a malicious actor has modified the BIOS 104), the BIOS 104 may be able to modify various settings of the computing system 100 by sending commands to the BMC 102. Thus, during the POST portion 202A, the BMC 102 will be able to transition between the locked state and the unlocked state with respect to commands received from the BIOS 104, in a similar fashion as described above with respect to the BMC 102 receiving commands from a user.

When the POST portion 202A begins at time 204A, the BMC 102 will transition to the locked state, if it is not already in the locked state. In some implementations, the locked state is the default state of the BMC 102 when the computing system 100 is started or re-started. At time 204B during the POST portion 202A, the BIOS 104 can send a BIOS unlock command to the BMC 102. The BIOS unlock command will include a BIOS unlock signature. The BMC 102 is configured to determine whether the BIOS unlock signature is authentic. If the BIOS unlock signature is authentic and the BMC 102 is in the locked state, and the BMC 102 is configured to transition to the unlocked state Thus, the BMC 102 is in the locked state during a sub-portion 206A of the POST portion 202A that begins when the POST portion 202A begins at time 204A, and ends when the BMC 102 receives a BIOS unlock command with an authentic BIOS unlock signature from the BIOS 104 at time 204B. At time 204C, the POST portion 202A ends (e.g., the boot process has ended) and the runtime portion 202B begins. If the BMC 102 is in the unlocked state when the POST portion 202A ends, the BMC 102 will transition back to the locked state. Thus, during a sub-portion 206B of the POST portion 202A that begins at time 204B and ends at time 204C when the POST portion 202A ends, the BMC 102 is in the unlocked state.

In some implementations, the authentication of the BIOS unlock signature in the BIOS unlock command functions the same way as the authentication of unlock signatures in unlock commands received from users. The BIOS 104 can hold the private key and use the private key to encrypt the BIOS unlock signature. In some cases, the private key is provided to the BIOS 104 (e.g., coded into the BIOS 104) by the manager of the computing system 100. When the BMC 102 receives the BIOS unlock command from the BIOS 104, the BMC 102 can use the public key to decrypt the BIOS unlock signature, and then determine whether the decrypted BIOS unlock signature is authentic. In some implementations, the decrypted BIOS unlock signature is authentic is it matches the BIOS unlock command (e.g., if the decrypted BIOS unlock signature is identical to the content of the BIOS unlock command). Thus, the BMC 102 can be in the unlocked state during the POST portion 202A (e.g., during the boot process) and respond to commands received from the BIOS 104, while still being protected against a malicious takeover over the BIOS 104 that may attempt to modify the computing system 100 during the POST portion 202A.

In some implementations, the computing system 100 includes a general-purpose input/output (GPIO) pin that indicates the status of the POST routine. The BMC 102 can monitor this GPIO pin to determine whether the BIOS is still implementing the POST routine. Thus, during the POST portion 202A, the BMC 102 sees that the GPIO pin indicates that the POST routine is ongoing, and stays in the unlocked state. When the POST portion 202A ends at time 204B, the GPIO pin indicates that the POST routine has ended. The BMC 102 detects this change, and transitions to the unlocked state. In some implementations, the GPIO pin has a low logical value when the POST routine is ongoing, and a high logical value when the POST routine is not ongoing. In other implementations, the GPIO pin has a high logical value when the POST routine is ongoing, and a low logical value when the POST routine is not ongoing.

Generally, any number of different GPIO pins within the computing system 100 can be used to determine whether the POST routine is ongoing. In some implementations, the GPIO pin that the BMC 102 monitors is part of the CPU 106. In other implementations, the GPIO pin that the BMC 102 monitors is part of another component of the computing system 100, such as a platform controller hub. Generally, any GPIO pin that the computing system 100 uses to indicate the status of the POST routine can be monitored by the BMC 102 to determine whether the POST routine is ongoing or not.

In other implementations, the BMC 102 may operate differently during the POST portion 202A. For example, instead of only unlocking in response to a BIOS unlock command with an authentic BIOS unlock signature, the BMC 102 may instead stay in the locked stated, during the entire POST portion 202A, stay in the unlocked stage during the entire POST portion 202A, transition to the unlocked state in response to receiving a BIOS unlock command regardless of whether an authentic BIOS unlock signature is included, etc.

In the flowchart 200, the runtime portion 202B is divided into a number of different sub-portions, showing the functionality of the BMC 102 during the runtime portion 202B. During a sub-portion 206C that extends between time 204C (the beginning of the runtime portion 202B) and time 204D, the BMC 102 is in the locked state and will ignore user commands. At time 204D, the BMC 102 receives an unlock command from a user that contains an authentic unlock signature, and transitions to the unlocked state. Once in the unlocked state, the BMC 102 will generally respond to all commands received from users, to thereby allow the users to access the hardware components 105 of the computing system 100.

In some implementations, the BMC 102 will remain in the unlocked state for a certain period after receiving the unlock command from the user. In some implementations, this period is defined to last a specific amount of time (e.g., 10 minutes, 30 minutes, 1 hours, etc.), a specific number of commands received from a given user (e.g., 5 commands, 10 commands, 30 commands, etc.), or both (e.g., the earliest of x number of minutes and y number of received commands). In some implementations, the period is defined as lasting for as long as commands are received at a rate that is at or above a threshold rate (e.g., the BMC 102 remains in the unlocked state so long as at least x commands are received every y seconds/minutes). In some implementations, the period is defined as lasting the entire time that a given user accesses the computing system 100. In some implementations, the period of time relative to other parameters. In general, the period may be predetermined (e.g., defined prior to the BMC 102 transitioning to the unlocked state) or variable (e.g., defined when or after the BMC 102 transitions to the unlocked state). Thus, the period can begin when the user access the computing system 100, and end when the user's access to the computing system is severed by the user and/or the computing system 100. In FIG. 2, the period is shown as sub-portion 206D, which lasts from time 204D to time 204E. The BMC 102 is in the unlocked state during sub-portion 206D. At time 204E the period ends, and the BMC 102 returns to the locked state. In the flowchart 200, the BMC 102 remains in the locked state during sub-portion 206E, which lasts until the end of the runtime portion 202B at time 204F.

In some implementations, the user can send a lock command to the BMC 102 to cause the BMC 102 to transition from the unlocked state to the locked state. For example, if a given user is done with their session, that user may send a lock command to the BMC 102 to cause the BMC 102 to transition to the locked state. In some implementations, the lock command does not require any signature (e.g., a lock signature), and the BMC 102 can transition to the locked state automatically in response to receiving the lock command. In other implementations however, the BMC 102 requires the lock command to have an authentic lock signature (e.g., a lock signature that is identical to the content of the lock command) in order to cause the BMC 102 to transition to the locked state. The BMC 102 could also automatically transition to the locked state if the user terminates their connection to the computing system 100 while the BMC 102 is in the unlocked state.

In flowchart 200, the computing system 100 is in the system management mode portion 202C starting at time 204F, when the BMC 102 is in the locked state. The computing system 100 can enter the system management mode if the computing system 100 detects that an error is occurring during the runtime portion 202B. In the system management mode, the computing system 100 returns control to the BIOS 104, where the BIOS 104 follows various procedures to correct the error. When the computing system 100 enters the system management mode, the BMC 102 can automatically transition to the unlocked state when the computing system 100 enters the system management mode, to ensure that the BMC 102 can perform any functions that may be needed while the computing system 100 is in the system management mode. For example, the BMC 102 may be required to handle system errors, and thus must be able to respond to commands received from the BIOS 104, the server manager, users, etc.

The system management mode portion 202C ends at time 204G, at which point the error has been corrected and the computing system 100 exits the system management mode. The BMC 102 automatically transitions back to the locked state, where it remains until the BMC 102 receives a valid unlock command, or the computing system 100 once again enters the system management mode. In the example illustrated in flowchart 200, the BMC 102 is in the locked state when the computing system 100 enters the system management mode, and thus automatically transitions to the unlocked state. In some cases, however, the BMC 102 may be in the unlocked state when the computing system 100 enters the system management mode. In these cases, the BMC 102 can simply remain in the unlocked state.

The BMC 102 can detect that the computing system 100 has entered the system management mode in a variety of ways. In some implementations, the computing system includes a GPIO pin that indicates whether the computing system 100 has entered the system management mode. This GPIO pin can have a logical high value when in the system management mode and a logical low value when not in the system management mode, or vice-versa. In either case, the BMC 102 can monitor this GPIO pin to determine when the computing system 100 enters the system management mode, and transition to the unlocked state if necessary. Similar to the POST routine, any number of different GPIO pins within the computing system 100 can be used to whether the POST routine is ongoing. In some implementations, the GPIO pin that the BMC 102 monitors is part of the CPU 106. In other implementations, the GPIO pin that the BMC 102 monitors is part of another component of the computing system 100, such as a platform controller hub. Generally, any GPIO pin that the computing system 100 uses to indicate whether the computing system 100 has entered the system management mode can be monitored by the BMC 102.

In other implementations, the computing system 100 may act like the illustrated implementation of the POST routine. In these implementations, the BMC 102 can automatically transition to the locked state when the system management mode begins (or stay in the locked state if already in the locked state), and the BIOS 104 itself can send the BIOS unlock command to the BMC 102 as needed. The BMC 102 can determine if the BIOS unlock signature included with the BIOS unlock command is authentic, and if so, transition to the unlocked state. The BIOS 104 can then send a lock command to the BMC 102 once the computing system 100 exits the system management mode, or the BMC 102 can be configured to automatically transition to the locked state (if not already in the locked state) when the computing system 100 exits the system management mode.

In further implementations, the BMC 102 can transition to the unlocked state when the GPIO pin indicates that the computing system 100 has entered the system management mode, and transition back to the locked state when the BIOS 104 sends the lock command. In additional implementations, the BMC 102 can transition to the unlocked state when the BIOS 104 sends the BIOS unlock command with an authentic BIOS unlock signature, and the BMC 102 can transition back to the locked state when the GPIO pin indicates that the computing system 100 has exited the system management mode.

While the flowchart 200 in FIG. 20 shows a single POST portion 202A, a single runtime portion 202B, and a single system management mode portion 202C, the computing system 100 may be the standard runtime environment and the system management mode multiple times during a given period of time, and may also run a POST routine multiple times during a given period of time (e.g., if the computing system 100 is initially turned on, and then later restarted while one or more users are connected). Thus, the BMC 102 can continually transition between the locked state and the unlocked state as needed while the computing system 100 operates.

Figure 3:
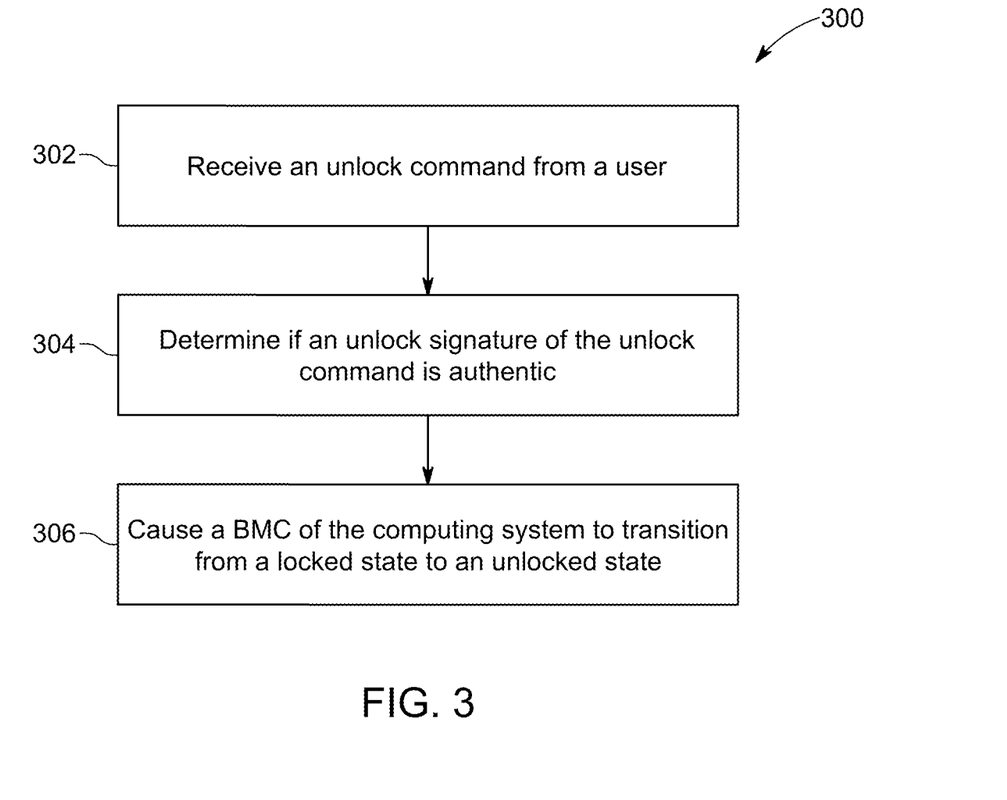
FIG. 3 is a flowchart of a method for securing the computing system of FIG. 1, according to aspects of the present disclosure.

FIG. 3 shows a flowchart of a method 300 of securing a computing system, such as the computing system 100 of FIG. 1. The computing system has a BIOS (such as the BIOS 104), a BMC (such as the BMC 102), and one or more hardware components (such as any of the hardware components 105) coupled to the BMC and the BIOS. At step 302, the BMC receives, from a user, an unlock command that includes some type of unlock signature.

At step 304, the BMC determines whether the unlock signature of the unlock command is an authentic unlock signature (e.g., whether the unlock signature is identical to the content of the unlock command). In some implementations, the unlock signature is encrypted. In these implementations, step 304 further comprises decrypting the unlock signature, and then determining whether the decrypted unlock signature is authentic. In some implementations, the unlock signature is encrypted using a private key, and the BMC holds the public key counterpart of the private key. The BMC can use the public key to decrypt the encrypted unlock signature.

At step 306, the BMC transitions from a locked state to an unlocked state if the unlock signature is authentic. When the BMC is in the locked state, the BMC will ignore commands received from a user (which may be a single user, a subset of users, or all users), such that the user cannot access the hardware components of the computing system. When the BMC is in the unlocked state, the BMC will respond to commands received from the user, such that the user can access the hardware components of the computing system, and use the computing system for a desired purpose.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
a basic input output system (BIOS);
a baseboard management controller (BMC) coupled to the BIOS, the BMC being configured to receive commands from one or more users of the computing system, and transition between a locked state and an unlocked state; and
one or more hardware components coupled to the BIOS and the BMC,
wherein the BMC is further configured to, while the computing system is operating in a standard runtime environment after a boot process:
  receive an unlock command from a respective user of the one or more users, the unlock command including an unlock signature;
  determine whether the unlock signature is authentic;
  in response to being in the locked state and determining that the unlock signature is authentic, transition to the unlocked state to allow the respective user to access the one or more hardware components
  in response to transitioning to the unlocked state, remain in the unlocked state for a period; and
  in response to the period ending, transition from the unlocked state to the locked state,
  wherein the predetermined period includes an amount of time, a number of commands received from the respective user, or both.

2. The computing system of claim 1, wherein the BMC is further configured to remain in the locked state in response to being in the locked state and determining that the unlock signature is not authentic.

3. The computing system of claim 1, wherein:
when the BMC is in the unlocked state, the BMC is configured to respond to (i) one or more commands received from the respective user that are not unlock commands, (ii) one or more unlock commands received from the respective user that do not contain an authentic unlock signature, or (iii) both (i) and (ii); and
when the BMC is in the locked state, the BMC is configured to ignore (i) any command received from the respective user that is not an unlock command, (ii) any unlock command received from the respective user that does not contain an authentic unlock signature, or (iii) both (i) and (ii).

4. The computing system of claim 1, wherein when in the unlocked state, the BMC is configured to respond to (i) one or more commands received from the respective user within the period that are not unlock commands, (ii) one or more commands received from the respective user within the period that do not contain an authentic unlock signature, or (iii) both (i) and (ii).

5. The computing system of claim 1, wherein the unlock signature is encrypted, and wherein the BMC is further configured to decrypt the encrypted unlock signature and determine whether the decrypted unlock signature is authentic.

6. The computing system of claim 5, wherein the encrypted unlock signature is encrypted using a private key, and wherein the BMC includes a public key counterpart to the private key that is used to decrypt the encrypted unlock signature.

7. The computing system of claim 5, wherein the unlock signature is authentic if the decrypted unlock signature is identical to the unlock command.

8. The computing system of claim 1, wherein the BMC is further configured to:
determine whether the computing system is undergoing the boot process;
receive a BIOS unlock command from the BIOS, the BIOS unlock command including a BIOS unlock signature;
determine whether the BIOS unlock signature is authentic;
in response to being in the locked state and determining (i) that the computing system is undergoing the boot process and (ii) that the BIOS unlock signature is authentic, transition from the locked state to the unlocked state; and
in response to being in the unlocked state and determining that the boot process has ended, transition from the unlocked state to the locked state.

9. The computing system of claim 1, wherein the BMC is further configured to:
determine whether the computing system has entered a system management mode;
in response to being in the locked state and determining that the computing system has entered the system management mode, transition to the unlocked state;
determine whether the computing system has exited the system management mode; and
in response to being in the unlocked state and determining that the computing system has exited the system management mode, transition to the locked state.

10. A method of securing a computing system that includes a basic input output system (BIOS), a baseboard management controller (BMC) coupled to the BIOS, and one or more hardware components coupled to the BIOS and the BMC, the method comprising, while the computing system is in a standard runtime environment after a boot process:
receiving an unlock command from a user of the computing system, the unlock command including an unlock signature;
determining whether the unlock signature is authentic;
in response to determining that the unlock signature is authentic and the BMC being in a locked state, causing the BMC to transition to an unlocked state, to allow the user to access the one or more hardware components of the computing system;
subsequent to causing the BMC to transition to the unlocked state, causing the BMC to remain in the unlocked state for a period; and
in response to the period ending, causing the BMC to transition from the unlocked state to the locked state,
wherein the period including an amount of time, a number of commands received from the respective user, or both.

11. The method of claim 10, further comprising, in response to determining that the unlock signature is not authentic and the BMC being in the locked state, causing the BMC to remain in the locked state.

12. The method of claim 10, further comprising:
responding, by the BMC when the BMC is in the unlocked state, to (i) one or more commands received from the user that are not unlock commands, (ii) one or more unlock commands received from the user that do not contain an authentic unlock signature, or (iii) both (i) and (ii); and
ignoring, by the BMC when the BMC is in the locked state, (i) any command received from the user that is not an unlock command, (ii) any unlock command received from the user that does not contain an authentic unlock signature, or (iii) both (i) and (ii).

13. The method of claim 10, wherein when in the unlocked state, the BMC is configured to respond to (i) one or more commands received from the user within the period that are not unlock commands, (ii) one or more commands received from the user within the period that do not contain an authentic unlock signature, or (iii) both (i) and (ii).

14. The method of claim 10, wherein the unlock signature is encrypted, and wherein the method further comprises decrypting the encrypted unlock signature and determining whether the decrypted unlock signature is authentic.

15. The method of claim 14, wherein the encrypted unlock signature is encrypted using a private key, and wherein the BMC includes a public key counterpart to the private key that is used to decrypt the encrypted unlock signature.

16. The method of claim 14, wherein determining whether the unlock signature is authentic includes determining whether the decrypted unlock signature is identical to the unlock command.

17. The method of claim 10, further comprising:
determining whether the computing system is undergoing the boot process;
receiving a BIOS unlock command from the BIOS, the BIOS unlock command including a BIOS unlock signature;
determining whether the BIOS unlock signature is authentic;
in response to the BMC being in the locked state and determining (i) that the computing system is undergoing the boot process and (ii) that the BIOS unlock signature is authentic, causing the BMC to transition to the unlocked state; and in response to the BMC being in the unlocked state and determining that the boot process has ended, causing the BMC to transition to the locked state.

18. The method of claim 10, further comprising:

determining whether the computing system has entered a system management mode;

in response to the BMC being in the locked state and determining that the computing system has entered the system management mode, causing the BMC to transition to the unlocked state;

determining whether the computing system has exited the system management mode; and in response to the BMC being in the unlocked state and determining that the computing system has exited the system management mode, causing the BMC to transition to the locked state.

\* \* \* \* \*